(12) United States Patent
Osborne et al.

(10) Patent No.: US 12,187,412 B2
(45) Date of Patent: Jan. 7, 2025

(54) INSULATION ATTACHMENT SYSTEM (71) Applicant: The Boeing Company, Chicago, IL (US)

(72) Inventors: John C. Osborne, Madison, AL (US); Steven A. Scott, Renton, WA (US)

(73) Assignee: The Boeing Company, Chicago, IL (US)

( * ) Notice: Subject to any disclaimer, the term of this patent is extended or adjusted under 35 U.S.C. 154(b) by 216 days.

(21) Appl. No.: 17/669,523

(22) Filed: Feb. 11, 2022

(65) Prior Publication Data
US 2023/0257098 A1 Aug. 17, 2023

(51) Int. Cl.
*B64C 1/40* (2006.01)
(52) U.S. Cl.
CPC .................................... *B64C 1/403* (2013.01)
(58) Field of Classification Search
CPC ................. B64C 1/40; B64C 1/403
See application file for complete search history.

(56) References Cited

U.S. PATENT DOCUMENTS

| | | | | |
|---|---|---|---|---|
| 6,260,660 | B1* | 7/2001 | Yoerkie, Jr. | B64C 1/40 |
| | | | | 181/290 |
| 9,988,137 | B2* | 6/2018 | Borumand | B64C 1/403 |
| 2009/0179111 | A1* | 7/2009 | Ebner | B64C 1/066 |
| | | | | 244/131 |
| 2012/0234979 | A1* | 9/2012 | Smith | B64C 1/12 |
| | | | | 105/396 |
| 2018/0201357 | A1* | 7/2018 | Borumand | B64C 1/40 |
| 2019/0100298 | A1* | 4/2019 | Gladstone | F16L 59/028 |
| 2022/0033050 | A1* | 2/2022 | Bardet | B60R 13/08 |

* cited by examiner

Primary Examiner — Christopher D Hutchens
(74) Attorney, Agent, or Firm — Joseph M. Butscher; The Small PAtent Law Group LLC (57) ABSTRACT

An insulation attachment system for an aircraft includes a first insulation blanket including a first tab at an aft end of the first insulation blanket and a second insulation blanket including a second tab at an aft end of the second insulation blanket. The system also includes a third insulation blanket and a first attachment component disposed on an outboard forward portion of the second insulation blanket and clasping a first frame member of the aircraft such that the first tab and the second insulation blanket are attached to the first frame member. The system also includes a second attachment component disposed on an outboard forward portion of the third insulation blanket and clasping a second frame member of the aircraft that is aft of the first frame member such that the second tab and the third insulation blanket are attached to the second frame member.

20 Claims, 10 Drawing Sheets

```
                    ┌─────────────────────────────────────────────────┐
                    │  PLACING A FIRST TAB AT AN AFT END OF A FIRST   │
                    │  INSULATION BLANKET OVER A FIRST FRAME MEMBER   │
                    │                 OF THE AIRCRAFT                 │
                    └─────────────────────────────────────────────────┘
                       302

┌─────────────────────────────────────────────────┐
                    │   PLACING, ONTO THE FIRST FRAME MEMBER, A FIRST │
                    │  ATTACHMENT COMPONENT THAT IS DISPOSED ON AN    │
                    │  OUTBOARD FORWARD PORTION OF A SECOND INSULATION│
                    │  BLANKET SUCH THAT THE FIRST ATTACHMENT         │
                    │  COMPONENT CLASPS THE FIRST FRAME MEMBER AND    │
                    │  ATTACHES THE FIRST TAB AND THE OUTBOARD        │
                    │  FORWARD PORTION OF THE SECOND INSULATION       │
                    │  BLANKET TO THE FIRST FRAME MEMBER              │
                    └─────────────────────────────────────────────────┘
                       304

┌─────────────────────────────────────────────────┐
                    │  PLACING A SECOND TAB AT AN AFT END OF THE      │
                    │  SECOND INSULATION BLANKET OVER A SECOND FRAME  │
                    │            MEMBER OF THE AIRCRAFT               │
                    └─────────────────────────────────────────────────┘
                       306

┌─────────────────────────────────────────────────┐
                    │  PLACING, ONTO THE SECOND FRAME MEMBER, A SECOND│
                    │  ATTACHMENT COMPONENT THAT IS DISPOSED ON AN    │
                    │  OUTBOARD FORWARD PORTION OF A THIRD INSULATION │
                    │  BLANKET SUCH THAT THE SECOND ATTACHMENT        │
                    │  COMPONENT CLASPS THE SECOND FRAME MEMBER AND   │
                    │  ATTACHES THE SECOND TAB AND THE OUTBOARD       │
                    │  FORWARD PORTION OF THE THIRD INSULATION        │
                    │  BLANKET TO THE SECOND FRAME MEMBER             │
                    └─────────────────────────────────────────────────┘
                       308
```

INSULATION ATTACHMENT SYSTEM

FIELD

The present disclosure generally relates to an insulation attachment system, and more specifically to an insulation attachment system for an aircraft.

BACKGROUND

Existing systems and methods for insulating an aircraft have several drawbacks. For example, conventional components used to hold an insulation blanket against an aircraft frame can compress the insulation blanket, which reduces the ability of the insulation to slow heat loss from the passenger cabin. This change in thermal properties caused by compression of the insulation can also cause moisture buildup between the insulation and the passenger cabin via condensation. Conventional insulation systems are also tedious to install. As such, a need exists for an insulation attachment system that provides better thermal insulation and moisture management properties, and that is easier to install.

SUMMARY

One aspect of the disclosure is an insulation attachment system for an aircraft, the insulation attachment system comprising: a first insulation blanket comprising a first tab at an aft end of the first insulation blanket; a second insulation blanket comprising a second tab at an aft end of the second insulation blanket; a third insulation blanket; a first attachment component disposed on an outboard forward portion of the second insulation blanket and clasping a first frame member of the aircraft such that the first tab and the outboard forward portion of the second insulation blanket are attached to the first frame member; and a second attachment component disposed on an outboard forward portion of the third insulation blanket and clasping a second frame member of the aircraft that is aft of the first frame member such that the second tab and the outboard forward portion of the third insulation blanket are attached to the second frame member.

Another aspect of the disclosure is a an attachment component for an aircraft, the attachment component comprising: a base; a first clasping member configured to conform to a first exterior corner at a first position on a frame member of an aircraft and configured to conform to a second exterior corner at a second position on the frame member; and a second clasping member joined to the first clasping member at the base, wherein the second clasping member is configured to conform to a first interior corner at the first position on the frame member and configured to conform to a second interior corner at the second position on the frame member.

Another aspect of the disclosure is a method of installing an insulation attachment system for an aircraft, the method comprising: placing a first tab at an aft end of a first insulation blanket over a first frame member of the aircraft; placing, onto the first frame member, a first attachment component that is disposed on an outboard forward portion of a second insulation blanket such that the first attachment component clasps the first frame member and attaches the first tab and the outboard forward portion of the second insulation blanket to the first frame member; placing a second tab at an aft end of the second insulation blanket over a second frame member of the aircraft; and placing, onto the second frame member, a second attachment component that is disposed on an outboard forward portion of a third insulation blanket such that the second attachment component clasps the second frame member and attaches the second tab and the outboard forward portion of the third insulation blanket to the second frame member.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

As noted above, a need exists for an insulation attachment system that provides better thermal insulation and moisture management properties, and that is easier to install. Within examples, an insulation attachment system for an aircraft includes a first insulation blanket that includes a first tab at an aft end of the first insulation blanket, and a second insulation blanket that includes a second tab at an aft end of the second insulation blanket. The insulation attachment system also includes a third insulation blanket and a first attachment component (e.g., a molded plastic clip) disposed on (e.g. attached or adhered to) an outboard forward portion of the second insulation blanket. The first attachment component clasps a first frame member of the aircraft such that the first tab and the outboard forward portion of the second insulation blanket are attached to (e.g., clasped to) the first frame member. The insulation attachment system also includes a second attachment component (e.g., a molded plastic clip) disposed on an outboard forward portion of the third insulation blanket. The second attachment component clasps a second frame member of the aircraft that is aft of the first frame member, such that the second tab and the outboard forward portion of the third insulation blanket are attached to (e.g., clasped to) the second frame member.

Holding the insulation blankets to the aircraft frame using attachment components on the outboard side of the insulation reduces or eliminates compression of the insulation blankets caused by attachment components. This, in turn, alleviates or eliminates reductions in insulation efficiency and condensation on the cabin side of the insulation.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Figure 1:
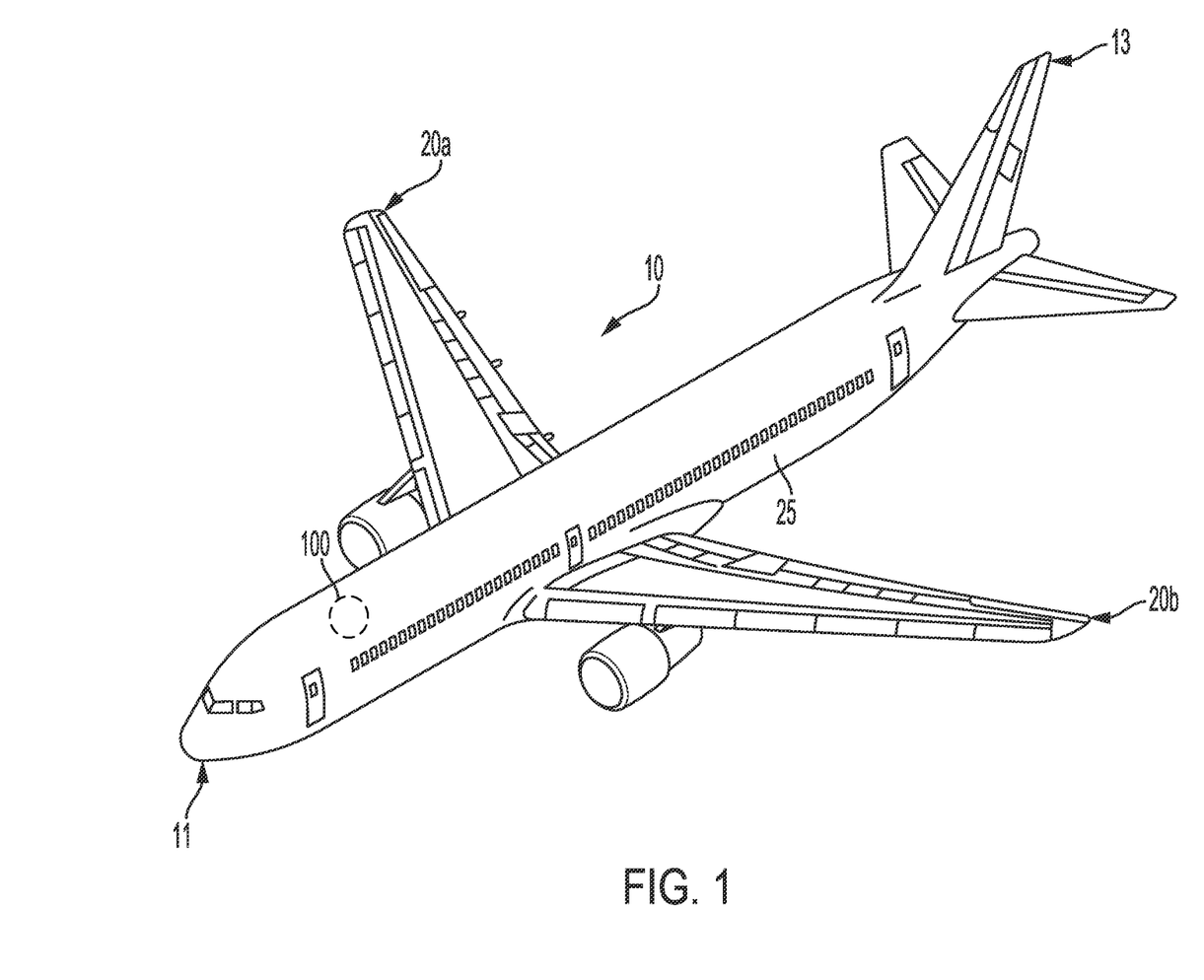
FIG. 1 is a perspective view of an aircraft, according to an example.

FIG. 1 is a perspective view of an aircraft 10 that includes a nose 11, a wing 20a, a wing 20b, a fuselage 25, a tail 13, and an insulation attachment system 100. The aircraft 10 includes many areas arranged for storage of items during flight. In one example, the fuselage 25 includes storage underneath a passenger compartment for storing luggage and other items or supplies. In another example, the passenger compartment in the fuselage 25 includes overhead bins and under seat areas for storing further items.

The aircraft 10 is shown as a commercial airliner, but other examples are possible. In FIG. 1, the insulation attachment system 100 is located near a forward end of the aircraft 10, however this is not required. In some examples, the aircraft 10 includes several insulation attachment systems 100 that collectively span most of the length of the fuselage 25.

Figure 2:
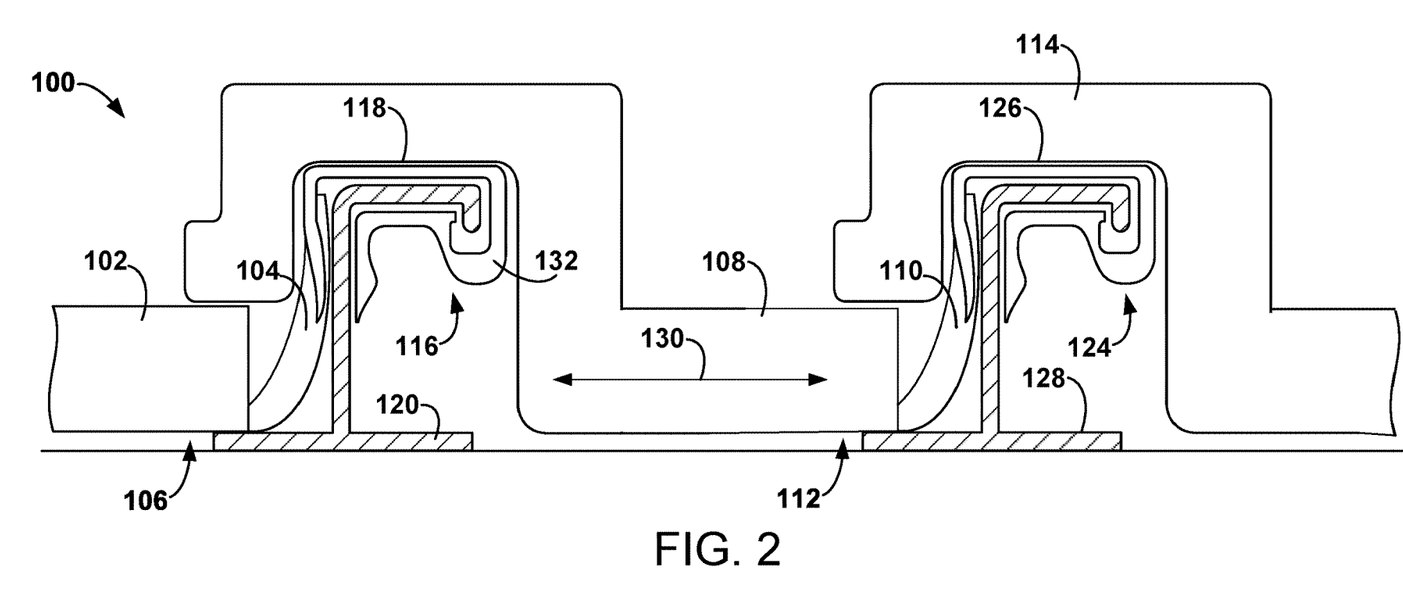
FIG. 2 is a top view of an insulation attachment system, according to an example.

FIG. 2 is a top view of the insulation attachment system 100. In FIG. 2, down is the outboard direction. The insulation attachment system 100 includes a first insulation blanket 102 that includes a first tab 104 at an aft end 106 of the first insulation blanket 102 and a second insulation blanket 108 that includes a second tab 110 at an aft end 112 of the second insulation blanket 108. The insulation attachment system 100 also includes a third insulation blanket 114, and a first attachment component 116 disposed on an outboard forward portion 118 of the second insulation blanket 108 and clasping a first frame member 120 of the aircraft 10 such that the first tab 104 and the outboard forward portion 118 of the second insulation blanket 108 are attached to the first frame member 120. The insulation attachment system 100 also includes a second attachment component 124 disposed on an outboard forward portion 126 of the third insulation blanket 114 and clasping a second frame member 128 of the aircraft 10 that is aft of the first frame member 120 such that the second tab 110 and the outboard forward portion 126 of the third insulation blanket 114 are attached to the second frame member 128.

The first insulation blanket 102, the second insulation blanket 108, and the third insulation blanket 114 each includes a foam or a fibrous material encapsulated by a moisture resistant barrier. At ends of the insulation blankets, tabs (e.g., the first tab 104 and the second tab 110) are used for direct or indirect attachment to frame members (e.g., the first frame member 120 and/or the second frame member 128) of the aircraft 10 and/or direct or indirect attachment to other insulation blankets. The first tab 104 and the second tab 110 are generally thinner than the remaining portion of the insulation blankets, but can include a fibrous weave for structural strength.

The second attachment component 124 clasps the second frame member 128 of the aircraft 10 that is aft of the first frame member 120 such that the first attachment component 116 and the second attachment component 124 apply a tension 130 to the second insulation blanket 108.

The first tab 104 is covered on an inboard side by the second insulation blanket 108 and the second tab 110 is covered on an inboard side by the third insulation blanket 114.

As shown, an installer can place the first tab 104 of the first insulation blanket 102 over (e.g., a portion of) the first frame member 120 and then place, onto the first frame member 120, the first attachment component 116 such that the first attachment component 116 clasps the first frame member 120 and attaches the first tab 104 and the outboard forward portion 118 of the second insulation blanket 108 to the first frame member 120. The installer can also place the second tab 110 of the second insulation blanket 108 over (e.g., a portion of) the second frame member 128 and place, onto the second frame member 128, the second attachment component 124 such that the second attachment component 124 clasps the second frame member 128 and attaches the second tab 110 and the outboard forward portion 126 of the third insulation blanket 114 to the second frame member 128.

Figure 3:
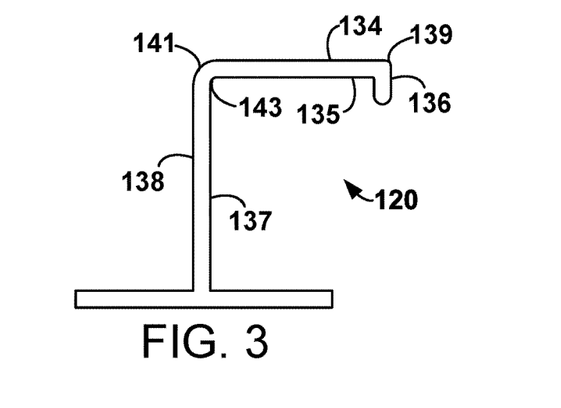
FIG. 3 is a top view of a frame member of an aircraft, according to an example.

FIG. 3 is a top view of the first frame member 120. In FIG. 3, down is the outboard direction. The first attachment component 116 includes a clip 132 that clasps the first frame member 120 and is attached to the second insulation blanket 108 such that the clip 132 contacts an inboard-facing surface 134 of the first frame member 120 and an outboard-facing surface 135 of the first frame member 120. The clip 132 is adhesively attached to the second insulation blanket 108. In addition, the clip 132 contacts at least four surfaces (e.g., four or five of the inboard-facing surface 134, the outboard-facing surface 135, surface 136, surface 137, and surface 138) defined by corners (e.g., corner 139, corner 141, and corner 143) formed by the first frame member 120.

Figure 4:
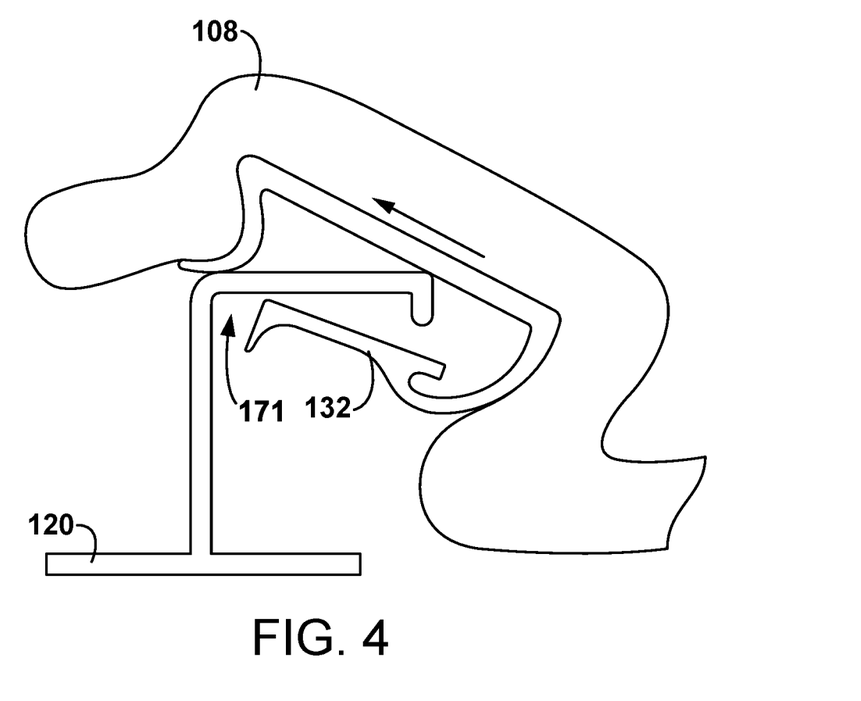
FIG. 4 is a top view showing installation of a clip, according to an example.

FIG. 4 is a top view showing installation of the clip 132 onto the first frame member 120. In FIG. 4, down is the outboard direction. As shown, a mouth 171 receives a portion of the first frame member 120 and the clip 132 is pushed leftward until the clip 132 snaps onto the first frame member 120 (as shown in FIG. 2).

Figure 5:
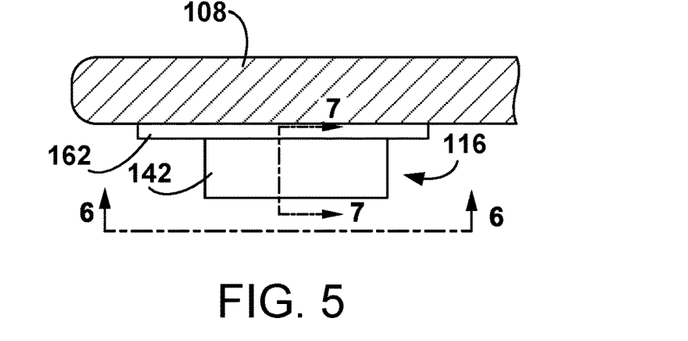
FIG. 5 is a top view of an attachment component, according to an example.

FIG. 5 is a top view of another embodiment of the first attachment component 116. In FIG. 5, down is the outboard direction. The first attachment component 116 includes a female component 142 that is attached to the second insulation blanket 108 (e.g., adhesively). More specifically, the female component 142 includes an inboard face 162 that is attached to the second insulation blanket 108.

Figure 6:
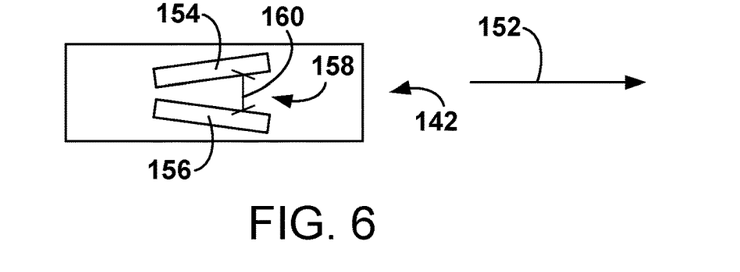
FIG. 6 is an inboard facing view of a female component, according to an example.

FIG. 6 is an inboard facing view of the female component 142. The female component 142 includes a first rail 154 and a second rail 156 that form a slot 158 that increases in width 160 in the aft direction 152.

Figure 7:
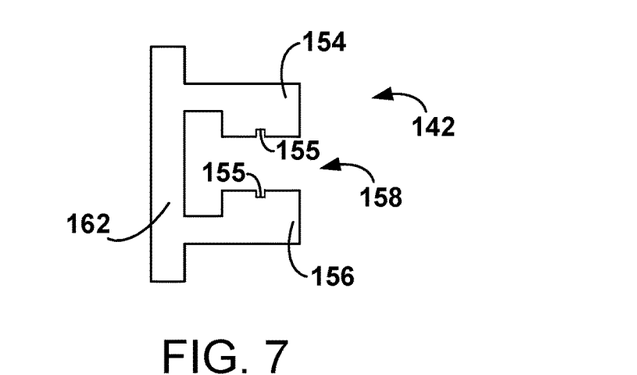
FIG. 7 is an aft facing cross sectional view of a female component, according to an example.

FIG. 7 is an aft facing cross sectional view of the female component 142. In FIG. 7, right is the outboard direction. The female component 142 includes recesses 155 in the slot 158 which are described in more detail below.

Figure 8:
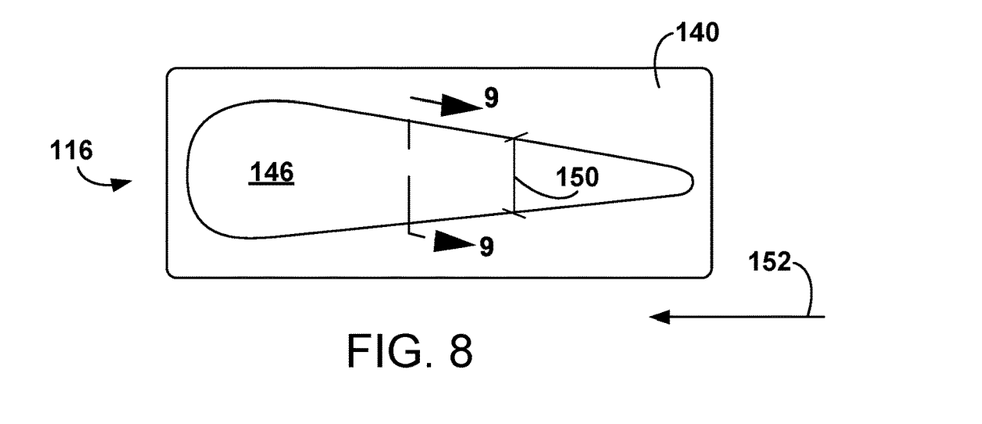
FIG. 8 is an outboard facing view of an attachment component, according to an example.

FIG. 8 is an outboard facing view of the embodiment of the first attachment component 116 shown in FIGS. 5-7. The first attachment component 116 includes a male component 140 that includes an inboard lip 146 that has a width 150 that increases in the aft direction 152.

Figure 9:
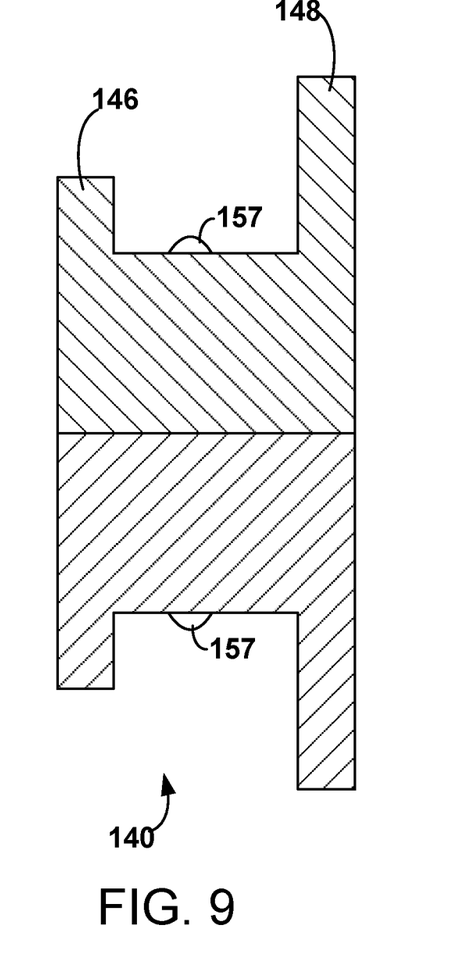
FIG. 9 is an aft facing cross sectional view of a male component, according to an example.

FIG. 9 is an aft facing cross sectional view of the male component 140. The male component 140 includes the inboard lip 146 that is received by the female component 142 and an outboard lip 148 that is wider than the inboard lip 146 and attached to the first frame member 120 (see FIG. 11). In FIG. 9, right is the outboard direction.

The male component 140 includes protrusions 157 that are configured to lock into the recesses 155 shown in FIG. 7, thereby resisting forward movement of the female component 142 relative to the male component 140.

The first tab 104 (e.g., a portion of the first tab 104) is positioned between the outboard lip 148 and the inboard lip 146.

Figure 10:
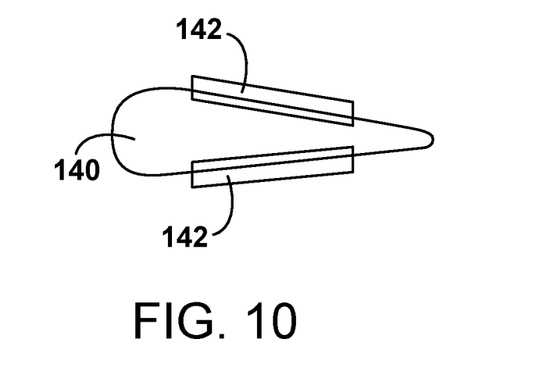
FIG. 10 is an outboard facing view of a male component received by a female component, according to an example.

FIG. 10 is an outboard facing view of the male component 140 received by the female component 142. In FIG. 10, left is the aft direction.

Figure 11:
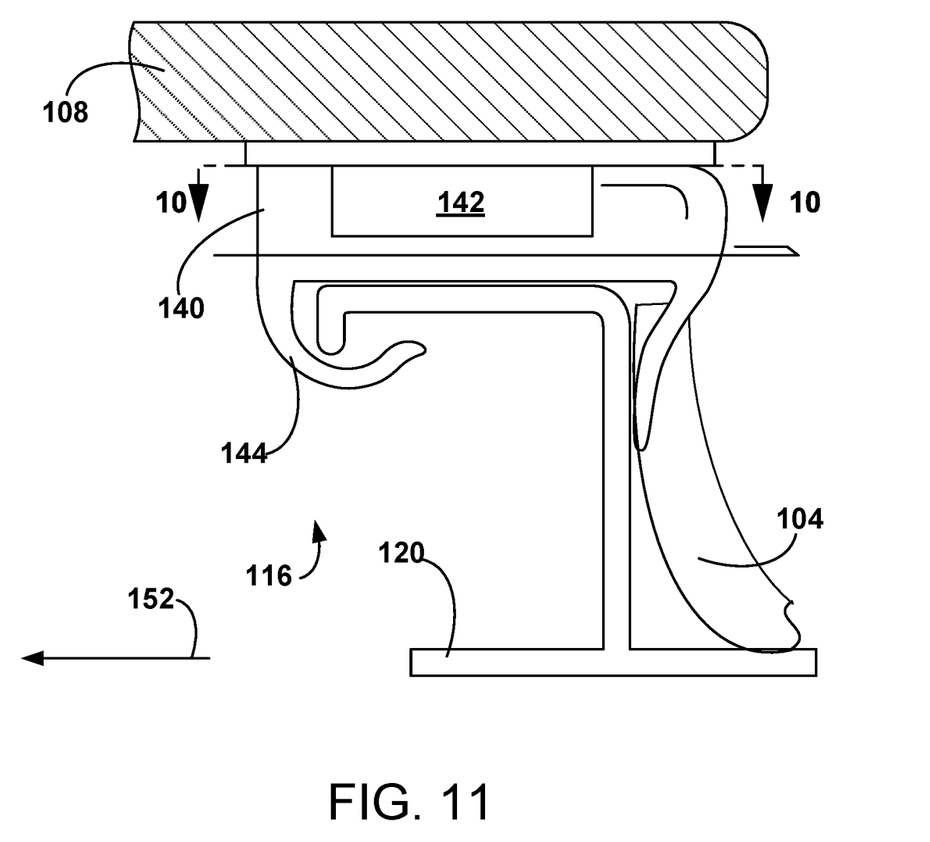
FIG. 11 is an assembled top view of an attachment component, according to an example.

FIG. 11 is an assembled top view of the first attachment component 116. In FIG. 11, down is the outboard direction. The male component 140 is attached to the first frame member 120 and the first tab 104. The female component 142 is configured to receive the male component 140 to attach the second insulation blanket 108 to the first tab 104 and the first frame member 120. More specifically, the female component 142 is configured to receive the male component 140 as the female component moves in the aft direction 152 with respect to the male component 140. The male component 140 comprises a clip 144 that clasps the first frame member 120.

Figure 12:
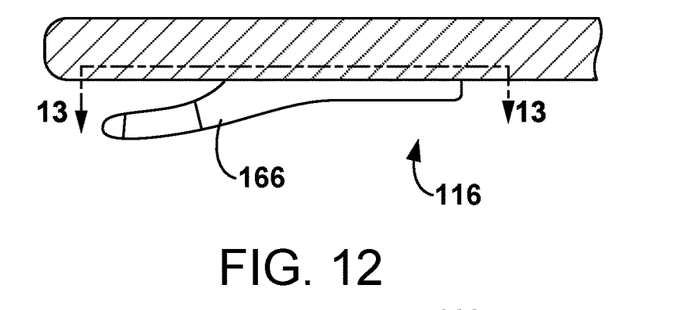
FIG. 12 is a top view of an attachment component, according to an example.

FIG. 12 is a top view of another embodiment of the first attachment component 116. In FIG. 12, down is the outboard direction and right is the aft direction. The first attachment component 116 includes a loop 166 that is (e.g., adhesively) attached to the second insulation blanket 108.

Figure 13:
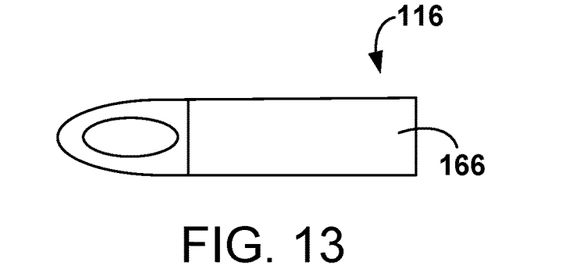
FIG. 13 is an inboard facing view of a loop, according to an example.

FIG. 13 is an inboard facing view of the loop 166. In FIG. 13, right is the aft direction.

Figure 14:
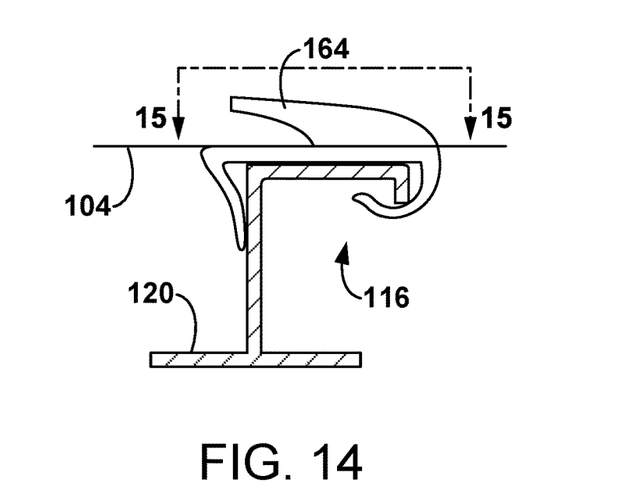
FIG. 14 is a top view of an attachment component, according to an example.

FIG. 14 is a top view of the embodiment of the first attachment component 116 shown in FIGS. 12 and 13. In FIG. 14, down is the outboard direction and right is the aft direction. The first attachment component 116 includes a hook 164 attached to the first frame member 120 and the loop 166 that is attached to the second insulation blanket 108 and engaged with the hook 164.

The hook 164 is clasped to the first frame member 120 such that such that the hook 164 contacts the inboard-facing surface 134 of the first frame member 120 and the outboard-facing surface 135 of the first frame member 120.

Figure 15:
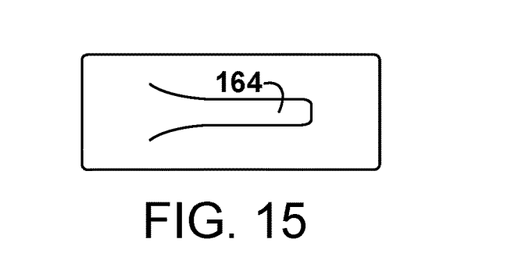
FIG. 15 is an outboard facing view of a hook, according to an example.

FIG. 15 is an outboard facing view of the hook 164. In FIG. 15, left is the aft direction.

Figure 16:
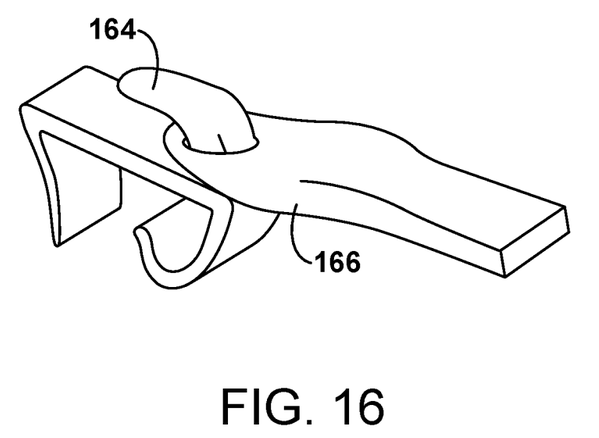
FIG. 16 is a perspective view of a hook engaged with a loop, according to an example.

FIG. 16 is a perspective view of the hook 164 engaged with the loop 166.

Figure 17:
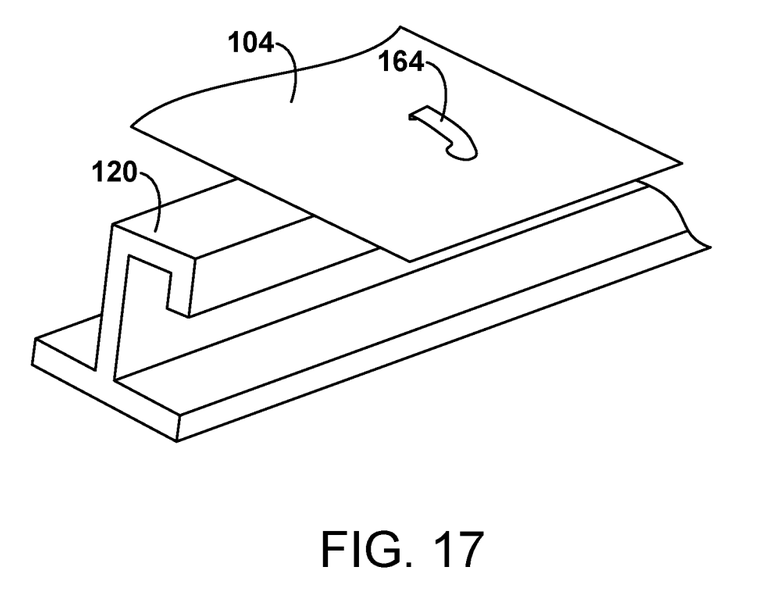
FIG. 17 is a perspective view of a hook penetrating a tab, according to an example.

FIG. 17 is a perspective view of the hook 164 penetrating the first tab 104.

Figure 18:
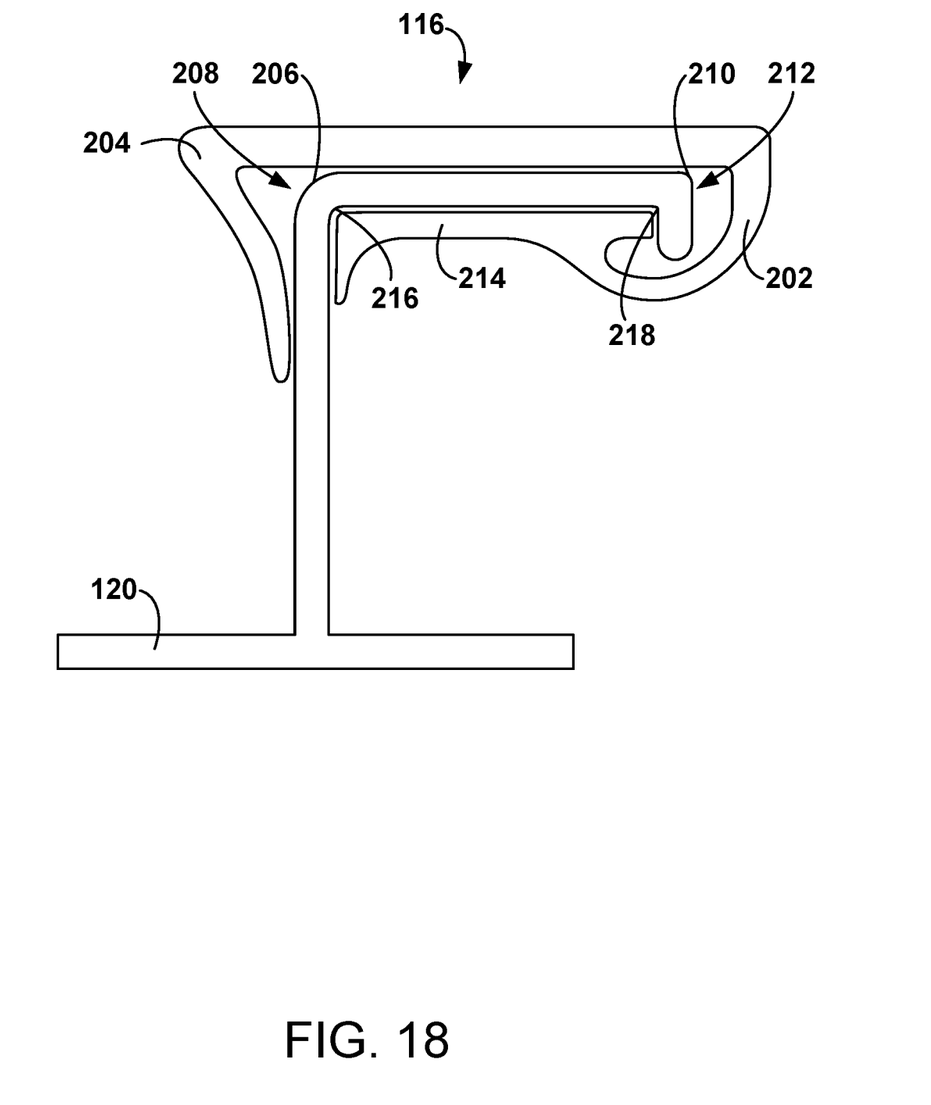
FIG. 18 is a top view of an attachment component, according to an example.

FIG. 18 is a top view of the first attachment component 116. The first attachment component 116 includes a base 202, a first clasping member 204, and a second clasping member 214.

The first clasping member 204 is configured to conform to (e.g., surround or cover) a first exterior corner 206 at a first position 208 on the first frame member 120 of the aircraft 10 and configured to conform to (e.g., surround or cover) a second exterior corner 210 at a second position 212 on the first frame member 120.

The second clasping member 214 is joined to the first clasping member 204 at the base 202. The second clasping member 214 is configured to conform to (e.g., surround or cover) a first interior corner 216 at the first position 208 on the first frame member 120 and configured to conform to (e.g., surround or cover) a second interior corner 218 at the second position 212 on the first frame member 120.

Figure 19:
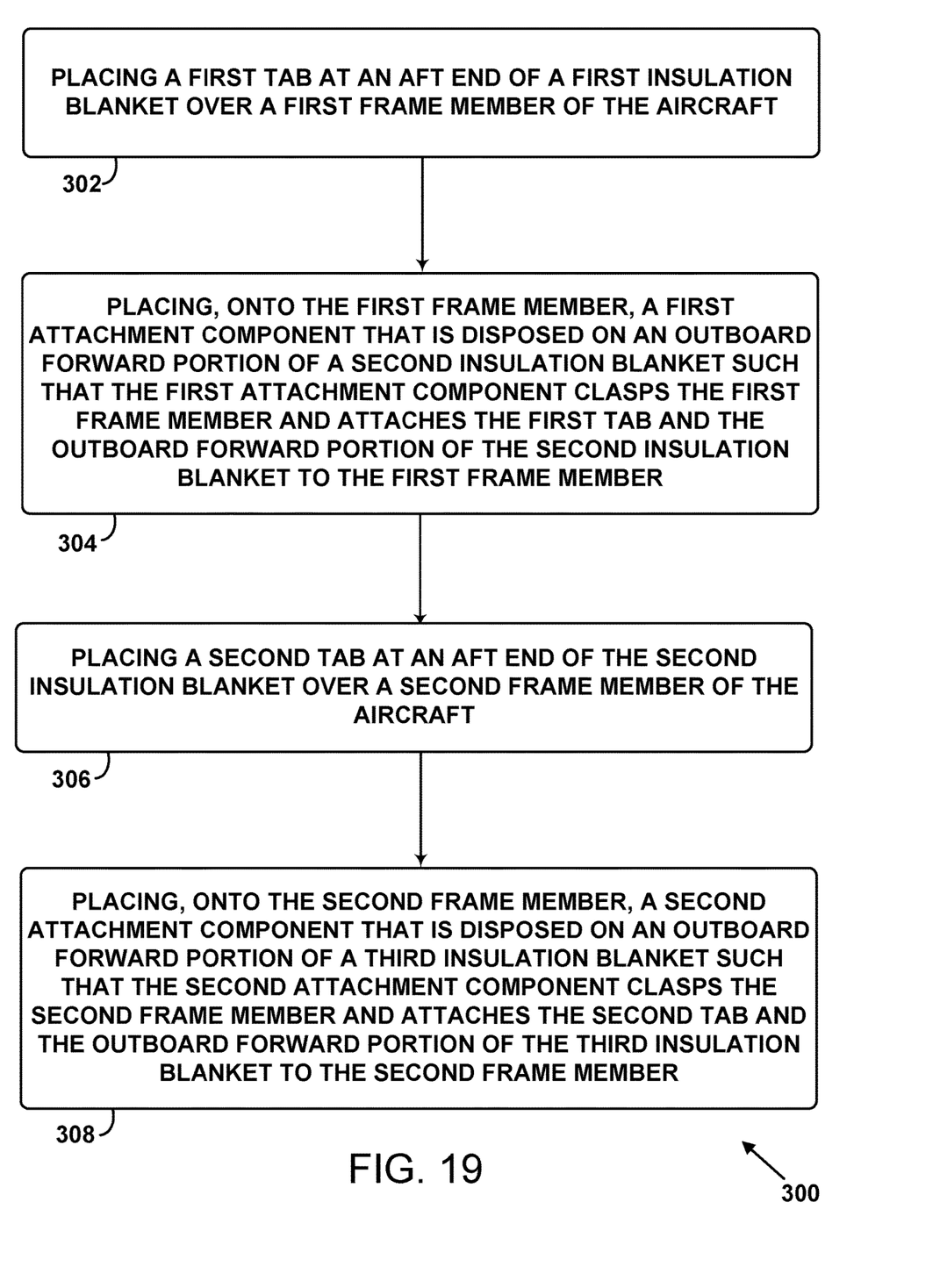
FIG. 19 is a block diagram of a method, according to an example.

FIG. 19 is a block diagram of a method 300 for installing the insulation attachment system 100 for the aircraft 10. As shown in FIG. 19, the method 300 includes one or more operations, functions, or actions as illustrated by blocks 302, 304, 306, and 308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes placing the first tab 104 at the aft end 106 of the first insulation blanket 102 over the first frame member 120 of the aircraft 10. This functionality is described above with reference to FIG. 2.

At block 304, the method 300 includes placing, onto the first frame member 120, the first attachment component 116 that is disposed on the outboard forward portion 118 of the second insulation blanket 108 such that the first attachment component 116 clasps the first frame member 120 and attaches the first tab 104 and the outboard forward portion 118 of the second insulation blanket 108 to the first frame member 120. This functionality is described above with reference to FIG. 2.

At block 306, the method 300 includes placing the second tab 110 at the aft end 112 of the second insulation blanket 108 over the second frame member 128 of the aircraft 10. This functionality is described above with reference to FIG. 2.

At block 308, the method 300 includes placing, onto the second frame member 128, the second attachment component 124 that is disposed on the outboard forward portion 126 of the third insulation blanket 114 such that the second attachment component 124 clasps the second frame member 128 and attaches the second tab 110 and the outboard forward portion 126 of the third insulation blanket 114 to the second frame member 128. This functionality is described above with reference to FIG. 2.

Examples of the present disclosure can thus relate to one of the enumerated clauses (ECs) listed below.

EC 1 is an insulation attachment system for an aircraft, the insulation attachment system comprising: a first insulation blanket comprising a first tab at an aft end of the first insulation blanket; a second insulation blanket comprising a second tab at an aft end of the second insulation blanket; a third insulation blanket; a first attachment component disposed on an outboard forward portion of the second insulation blanket and clasping a first frame member of the aircraft such that the first tab and the outboard forward portion of the second insulation blanket are attached to the first frame member; and a second attachment component disposed on an outboard forward portion of the third insulation blanket and clasping a second frame member of the aircraft that is aft of the first frame member such that the second tab and the outboard forward portion of the third insulation blanket are attached to the second frame member.

EC 2 is the insulation attachment system of EC 1, wherein the second attachment component clasps the second frame member of the aircraft that is aft of the first frame member such that the first attachment component and the second attachment component apply a tension to the second insulation blanket.

EC 3 is the insulation attachment system of any of ECs 1-2, wherein the first attachment component comprises a clip that clasps the first frame member and is attached to the second insulation blanket such that the clip contacts an inboard-facing surface of the first frame member and an outboard-facing surface of the first frame member.

EC 4 is the insulation attachment system of EC 3, wherein the clip is adhesively attached to the second insulation blanket.

EC 5 is the insulation attachment system of any of ECs 3-4, wherein the clip contacts at least four surfaces defined by corners formed by the first frame member.

EC 6 is the insulation attachment system of any of ECs 1-5, wherein the first attachment component comprises: a male component attached to the first frame member and the first tab; and a female component attached to the second insulation blanket, wherein the female component is configured to receive the male component to attach the second insulation blanket to the first tab and the first frame member.

EC 7 is the insulation attachment system of EC 6, wherein the male component comprises a clip that clasps the first frame member.

EC 8 is the insulation attachment system of any of ECs 6-7, wherein the male component comprises: an inboard lip that is received by the female component; and an outboard lip that is wider than the inboard lip and attached to the first frame member.

EC 9 is the insulation attachment system of EC 8, wherein the first tab is positioned between the outboard lip and the inboard lip.

EC 10 is the insulation attachment system of any of ECs 8-9, wherein the inboard lip has a width that increases in an aft direction.

EC 11 is the insulation attachment system of any of ECs 6-10, wherein the female component is configured to receive the male component as the female component moves aft with respect to the male component.

EC 12 is the insulation attachment system of any of ECs 6-11, wherein the female component comprises a first rail and a second rail that form a slot that increases in width in an aft direction.

EC 13 is the insulation attachment system of EC 12, wherein the female component comprises a recess in the slot and the male component comprises a protrusion that is configured to lock into the recess, thereby resisting forward movement of the female component relative to the male component.

EC 14 is the insulation attachment system of any of ECs 6-13, wherein the female component comprises an inboard face that is attached to the second insulation blanket.

EC 15 is the insulation attachment system of any of ECs 1-14, wherein the first attachment component comprises: a hook attached to the first frame member; and a loop attached to the second insulation blanket and engaged with the hook.

EC 16 is the insulation attachment system of EC 15, wherein the loop is adhesively attached to the second insulation blanket.

EC 17 is the insulation attachment system of any of ECs 15-16, wherein the hook is clasped to the first frame member such that such that the hook contacts an inboard-facing surface of the first frame member and an outboard-facing surface of the first frame member.

EC 18 is the insulation attachment system of any of ECs 1-17, wherein the first tab is covered on an inboard side by the second insulation blanket, and wherein the second tab is covered on an inboard side by the third insulation blanket.

EC 19 is an attachment component for an aircraft, the attachment component comprising: a base; a first clasping member configured to conform to a first exterior corner at a first position on a frame member of an aircraft and configured to conform to a second exterior corner at a second position on the frame member; and a second clasping member joined to the first clasping member at the base, wherein the second clasping member is configured to conform to a first interior corner at the first position on the frame member and configured to conform to a second interior corner at the second position on the frame member.

EC 20 is a method of installing an insulation attachment system for an aircraft, the method comprising: placing a first tab at an aft end of a first insulation blanket over a first frame member of the aircraft; placing, onto the first frame member, a first attachment component that is disposed on an outboard forward portion of a second insulation blanket such that the first attachment component clasps the first frame member and attaches the first tab and the outboard forward portion of the second insulation blanket to the first frame member; placing a second tab at an aft end of the second insulation blanket over a second frame member of the aircraft; and placing, onto the second frame member, a second attachment component that is disposed on an outboard forward portion of a third insulation blanket such that the second attachment component clasps the second frame member and attaches the second tab and the outboard forward portion of the third insulation blanket to the second frame member.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An insulation attachment system for an aircraft, the insulation attachment system comprising:
    a first insulation blanket comprising a first tab at an aft end of the first insulation blanket;
    a second insulation blanket comprising a second tab at an aft end of the second insulation blanket;

a third insulation blanket;
a first attachment component in contact with an outboard forward portion of the second insulation blanket and clasping a first frame member of the aircraft such that the first tab and the outboard forward portion of the second insulation blanket are attached to the first frame member, wherein the first frame member includes a base that extends forward to aft, a first arm that extends inboard from the base, and a second arm that extends aft from the first arm, wherein the first attachment component clasps an aft end of the first tab on a forward side of the first arm; and
a second attachment component disposed on an outboard forward portion of the third insulation blanket and clasping a second frame member of the aircraft that is aft of the first frame member such that the second tab and the outboard forward portion of the third insulation blanket are attached to the second frame member.

2. The insulation attachment system of claim 1, wherein the second attachment component clasps the second frame member of the aircraft that is aft of the first frame member such that the first attachment component and the second attachment component apply a tension to the second insulation blanket.

3. The insulation attachment system of claim 1, wherein the first attachment component comprises a clip that clasps the first frame member and is attached to the second insulation blanket such that the clip contacts an inboard-facing surface of the first frame member.

4. The insulation attachment system of claim 3, wherein the clip contacts at least four surfaces defined by corners formed by the first frame member.

5. The insulation attachment system of claim 3, wherein the clip is attached to the second insulation blanket such that the clip contacts an outboard-facing surface of the first frame member.

6. The insulation attachment system of claim 1, wherein the first attachment component comprises:
a male component attached to the first frame member and the first tab; and
a female component attached to the second insulation blanket, wherein the female component is configured to receive the male component to attach the second insulation blanket to the first tab and the first frame member.

7. The insulation attachment system of claim 6, wherein the male component comprises a clip that clasps the first frame member.

8. The insulation attachment system of claim 6, wherein the male component comprises:
an inboard lip that is received by the female component; and
an outboard lip that is wider than the inboard lip and attached to the first frame member.

9. The insulation attachment system of claim 8, wherein the first tab is positioned between the outboard lip and the inboard lip.

10. The insulation attachment system of claim 8, wherein the inboard lip has a width that increases in an aft direction.

11. The insulation attachment system of claim 6, wherein the female component is configured to receive the male component as the female component moves aft with respect to the male component.

12. The insulation attachment system of claim 6, wherein the female component comprises a first rail and a second rail that form a slot that increases in width in an aft direction.

13. The insulation attachment system of claim 12, wherein the female component comprises a recess in the slot and the male component comprises a protrusion that is configured to lock into the recess, thereby resisting forward movement of the female component relative to the male component.

14. The insulation attachment system of claim 6, wherein the female component comprises an inboard face that is attached to the second insulation blanket.

15. The insulation attachment system of claim 1, wherein the first attachment component comprises:
a hook attached to the first frame member; and
a loop attached to the second insulation blanket and engaged with the hook.

16. The insulation attachment system of claim 15, wherein the hook is clasped to the first frame member such that such that the hook contacts an inboard-facing surface of the first frame member and an outboard-facing surface of the first frame member.

17. The insulation attachment system of claim 1, wherein the first tab is covered on an inboard side by the second insulation blanket, and wherein the second tab is covered on an inboard side by the third insulation blanket.

18. The insulation attachment system of claim 1, wherein the first attachment component is attached to and in contact with the second insulation blanket.

19. The insulation attachment system of claim 1, wherein the first attachment component clasps the first tab between the first attachment component and the first frame member.

20. An insulation attachment system for an aircraft, the insulation attachment system comprising:
a first insulation blanket comprising a first tab at an aft end of the first insulation blanket;
a second insulation blanket comprising a second tab at an aft end of the second insulation blanket;
a third insulation blanket;
a first attachment component in contact with an outboard forward portion of the second insulation blanket and clasping a first frame member of the aircraft such that the first tab and the outboard forward portion of the second insulation blanket are attached to the first frame member, wherein the first frame member includes a base that extends forward to aft, a first arm that extends inboard from the base, and a second arm that extends aft from the first arm, wherein the first attachment component clasps an aft end of the first tab on a forward side of the first arm; and
a second attachment component disposed on an outboard forward portion of the third insulation blanket and clasping a second frame member of the aircraft that is aft of the first frame member such that the second tab and the outboard forward portion of the third insulation blanket are attached to the second frame member,
wherein the second attachment component clasps the second frame member of the aircraft that is aft of the first frame member such that the first attachment component and the second attachment component apply a tension to the second insulation blanket, and
wherein the first attachment component comprises a clip that clasps the first frame member and is attached to the second insulation blanket such that the clip contacts an inboard-facing surface of the first frame member.

* * * * *